United States Patent [19]
Bassett

[11] Patent Number: 5,337,832
[45] Date of Patent: Aug. 16, 1994

[54] REPOSITIONING MECHANISM FOR AN AGRICULTURAL IMPLEMENT

[76] Inventor: James H. Bassett, Dawn Equipment Co., 1210 E. State St., Sycamore, Ill. 60178

[21] Appl. No.: 926,713

[22] Filed: Aug. 6, 1992

[51] Int. Cl.$^5$ .......................... A01B 63/00; G05G 5/06
[52] U.S. Cl. ..................... 172/504; 172/744; 111/164; 74/529
[58] Field of Search ............... 172/504, 744, 99, 230, 172/332, 705; 74/510, 527, 529, 552, 558, 545, 551.8, 491, 504; 111/139, 137, 164, 166; 411/81, 171, 166, 1, 918, 500

[56] References Cited

U.S. PATENT DOCUMENTS

| | | | |
|---|---|---|---|
| 2,692,544 | 10/1954 | Jessup | 172/504 |
| 4,375,837 | 3/1983 | van der Lely et al. | 172/504 |
| 4,506,610 | 3/1985 | Neal | 111/139 |
| 4,537,262 | 8/1985 | van der Lely | 172/504 |
| 4,550,122 | 10/1985 | David et al. | 172/504 |
| 4,553,607 | 11/1985 | Behn et al. | 172/504 |
| 4,703,809 | 11/1987 | Van den Ende | 172/504 |
| 5,076,180 | 12/1991 | Schneider | 111/139 |
| 5,129,282 | 7/1992 | Bassett et al. | 111/139 |

*Primary Examiner*—Clifford D. Crowder
*Assistant Examiner*—Michael A. Neas

*Attorney, Agent, or Firm*—Wood, Phillips, VanSanten, Hoffman and Ertel

[57] ABSTRACT

A repositioning mechanism for an agricultural implement. The mechanism has an adjusting rod with a length, a receptacle for the adjusting rod, cooperating structure on the adjusting rod and receptacle for relatively moving the adjusting rod and receptacle lengthwise of the adjusting rod as an incident of the adjusting rod being rotated about its length, structure on the receptacle for mounting an agricultural implement so that the agricultural implement moves with the receptacle, an operating handle, and structure for attaching the operating handle to the adjusting rod to facilitate rotation of the adjusting rod about its length by manipulation of the operating handle. The attaching structure, in one form, is a pin on one of the operating handle and adjusting rod and a slot on the other of the operating handle and adjusting rod, to receive the pin with the operating handle and adjusting rod in an operative position. The pin, operating handle and adjusting rod cooperate to prevent separation of the operating handle and adjusting rod, one from the other, other than by repositioning the pin relative to the one of the operating handle and adjusting rod and removing the pin from the slot.

18 Claims, 3 Drawing Sheets

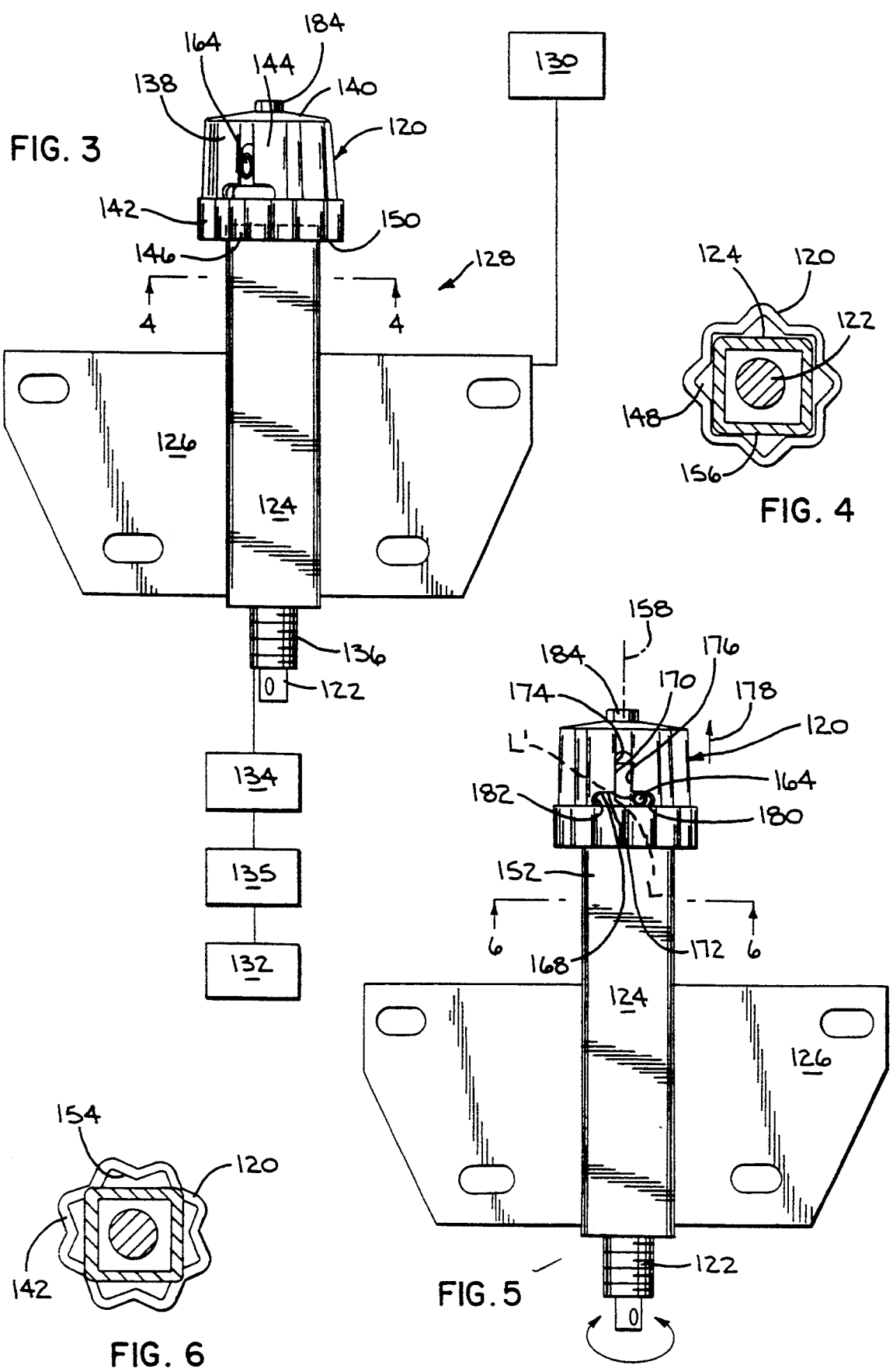

REPOSITIONING MECHANISM FOR AN AGRICULTURAL IMPLEMENT

BACKGROUND OF THE INVENTION

1. Field of the Invention

This invention relates to agricultural equipment and, more particularly, to a mechanism for repositioning implements, as to adjust the height thereof relative to a towable mounting frame.

2. Background Art

It is common to utilize gang mounted agricultural implements to continuously treat a substantial width of a field behind a towing vehicle. The implements may take any of a number of different forms. For example, the implements can be residue mulchers or resituators, cultivators, planters, fertilizers, etc. It is also known to provide a height adjustment capability for the individual implements. This feature accommodates different terrains and allows the user to alter soil working depth. Because the implements and associated frame are quite bulky and heavy, it is normally impractical to resituate any substantial number of the implements simultaneously. Consequently, designers have been mounting such implements to be individually repositionable. Examples of exemplary prior art structures are seen in U.S. Pat. No. 353,491 to Hepworth et al, and U.S. Pat. No. 2,925,872, to Darnell.

John Deere currently manufactures a mechanism for repositioning an agricultural implement which employs an adjusting rod that is rotatable to individually raise and lower implements. An operating handle is provided on the top of the rod and is grasped and turned to rotate the adjusting rod to thereby raise and lower the associated implement.

One difficulty with this structure is that it does not lend itself to automated operation. Instead, the user must grasp and manually turn the operating handle for each individual implement. Not only is this inconvenient and time consuming, but inevitably the user's hands and arms fatigue, particularly in certain equipment which may employ dozens of such individual implements.

Another problem with the prior art structures resides in the particular configuration of the operating handle. One such operating handle, which is described in greater detail below, is molded from plastic and has an inverted, cup-shaped configuration. The open end of the operating handle is placed over the top of the adjusting rod. The adjusting rod has a pin thereon which is guided into a control slot on the operating handle. Once the operating handle is in its operative position on the operating rod, a U-shaped wire clip is directed radially through the body of the operating handle to thereby prevent inadvertent withdrawal of the pin from the slot in the operating handle.

This particular construction has a number of drawbacks. First of all, while manufacture from plastic is economical, the plastic is prone to cracking and being stripped by the pin on the adjusting rod.

A further problem is that the wire clip is relatively difficult to seat in its locked position. The user must direct the free ends of the legs through holes on one side of the handle into and through aligned holes at a diametrically opposite location. The user may have difficulty aligning the clip to effect assembly thereof. The clip may be dropped and lost during the assembly process. Further, the wire clip is relatively thin and prone to rusting, corrosion from chemicals, and breakage. Still further, the clip may work itself loose under the vibrations normally encountered in the operating environment, which would then free the operating handle from the adjusting rod.

SUMMARY OF THE INVENTION

The present invention is directed to a repositioning mechanism for an agricultural implement. The mechanism has an adjusting rod with a length, a receptacle for the adjusting rod, cooperating structure on the adjusting rod and receptacle for relatively moving the adjusting rod and receptacle lengthwise of the adjusting rod as an incident of the adjusting rod being rotated about its length, structure on the receptacle for mounting an agricultural implement so that the agricultural implement moves with the receptacle, an operating handle, and structure for attaching the operating handle to the adjusting rod to facilitate rotation of the adjusting rod about its length by manipulation of the operating handle. The attaching structure, in one form, is a pin on one of the operating handle and adjusting rod and a slot on the other of the operating handle and adjusting rod, to receive the pin with the operating handle and adjusting rod in an operative position. The pin, operating handle and adjusting rod cooperate to prevent separation of the operating handle and adjusting rod, one from the other, other than by repositioning the pin relative to the one of the operating handle and adjusting rod and removing the pin from the slot.

Consequently, so long as the pin is in place on the one of the operating handle and adjusting rod, the operating handle is positively held operatively in place relative to the adjusting rod.

The invention further contemplates the above agricultural implement repositioning mechanism in combination with a sleeve through which the adjusting rod extends. There is cooperating keying structure on the sleeve and operating handle to selectively prevent rotation of the adjusting rod and operating handle about the length of the adjusting rod to thereby set and maintain a desired height for an associated implement.

The invention further contemplates, in one form, the provision of a bracket for mounting the repositioning mechanism to a support and structure for attaching the sleeve to the mounting bracket.

In one form, the slot has an L-shaped configuration with first and second transverse legs, with one of the first and second legs extending substantially parallel to the length of the adjusting rod.

In another form, the slot has a T-shaped configuration with a stem and a crossbar with the stem extending substantially parallel to the length of the adjusting rod. With this arrangement, the pin moves to one end of the cross bar as the operating handle is rotated in one direction and to the other end of the cross bar as the handle is rotated in the opposite direction.

In a preferred form, the operating handle has a single piece that defines and completely bounds the slot.

To facilitate rotation of the operating handle, a fitting, to be engaged by a wrench, or the like, is provided thereon. Preferably, this fitting is also integrally formed with the one piece defining the slot. The fitting allows an automated wrench or other tool to be used to effect rotation of the operating handle. This repositioning of the various implements can then be rapidly and conveniently carried out without user fatigue.

In a preferred form, the operating handle and fitting are made from metal, as by a casting process, to provide a durable construction.

In one form, the pin is frictionally retained in the one of the operating handle and adjusting rod. In one preferred form, a bore is provided in the one of the operating handle and adjusting rod to frictionally receive the pin.

In one form, the cooperating structure on the adjusting rod and receptacle is cooperating threads which cause the adjusting rod and receptacle to a) move relatively in one direction as the adjusting rod is rotated in a first direction relative to the receptacle and b) move relatively oppositely to the one direction as the adjusting rod is rotated oppositely to the first direction.

The invention further contemplates a repositioning mechanism for an agricultural implement having an adjusting rod with a length, structure for connecting between the adjusting rod and an agricultural implement for repositioning an agricultural implement as an incident of the adjusting rod being rotated about its length, an operating handle having a peripheral wall with an outside surface that can be grasped by the hand of a user to manipulate the operating handle, and structure for attaching the operating handle to the adjusting rod to facilitate rotation of the adjusting rod about its length by manipulation of the operating handle. The attaching structure is preferably a pin on the adjusting rod and a slot on the operating handle, extending fully through this peripheral wall of the operating handle to be exposed at the outside surface of the operating handle, for receiving the pin with the operating handle and adjusting rod in an operative position.

In one form, the operating handle is provided in combination with a sleeve through which the adjusting rod extends. The pin is movable within the slot to allow movement of the operating handle lengthwise of the adjusting rod between locked and unlocked/release positions. There is cooperating keying structure on the sleeve and operating handle to prevent rotation of the operating rod and adjusting handle about the length of the adjusting rod with the operating handle in its locked position.

The invention further contemplates an operating handle for a repositioning mechanism on an agricultural implement of the type having an elongate adjusting rod with a pin projecting transversely to the length of the adjusting rod. The operating handle has a cup-shaped peripheral wall with a central axis and an outside surface that can be grasped by the hand of a user to manipulate the operating handle, a top wall, a fitting on the top wall to be engaged by a wrench to rotate the operating handle about its axis, and a slot for reception of a pin on an adjusting rod. The pin maintains the operating handle in an operative position on an adjusting rod with which it cooperates.

The invention still further contemplates an operating handle for a repositioning mechanism on an agricultural implement of the type having an elongate adjusting rod with a pin projecting transversely to the length of the adjusting rod, which operating handle has a peripheral wall with a central axis and an outside surface that can be grasped by the hand of a user to manipulate the operating handle, and a slot for reception of a pin on an adjusting rod, wherein the peripheral wall completely bounds the slot.

In one form, the slot extends fully through the peripheral wall.

BRIEF DESCRIPTION OF THE DRAWINGS

FIG. 3 is a front elevation view of an agricultural implement repositioning mechanism according to the present invention and shown in a locked position;

FIG. 4 is a cross-sectional view of the repositioning mechanism taken along line 4—4 of FIG. 3;

FIG. 5 is a view as in FIG. 3 with the repositioning mechanism in a release position;

FIG. 6 is a cross-sectional view of the repositioning mechanism taken along line 6—6 of FIG. 5;

DETAILED DESCRIPTION OF THE DRAWINGS

Figure 1:
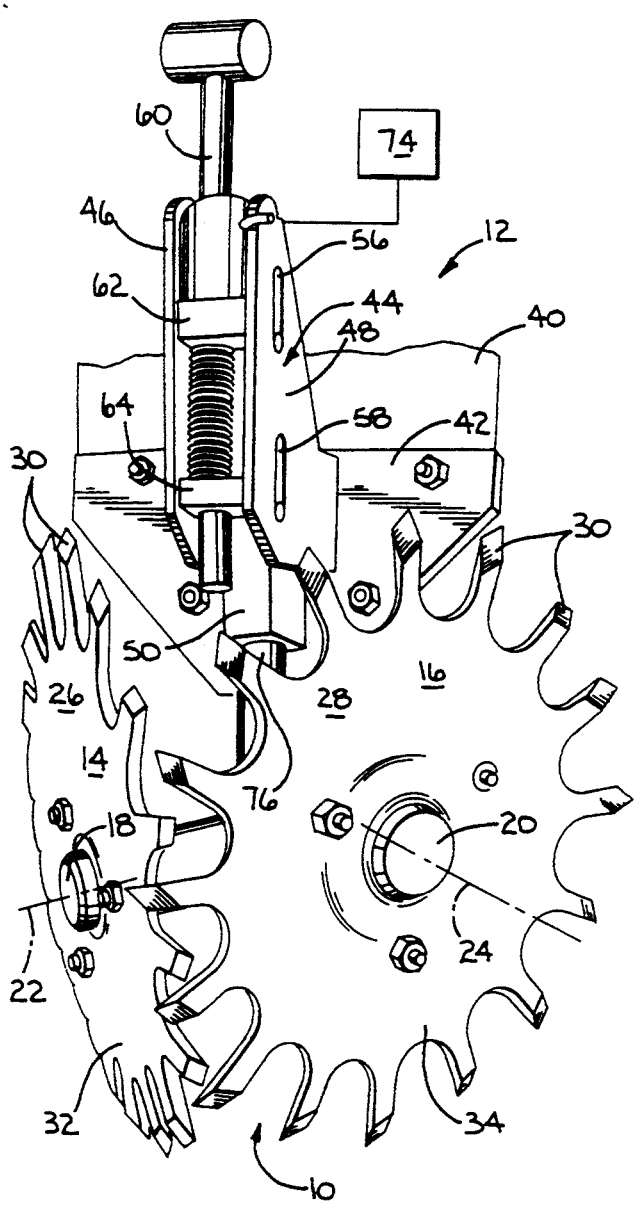
FIG. 1 is a perspective view of a prior art agricultural implement and showing a repositioning mechanism therefor with the implement shown in a lowered position.
Figure 2:
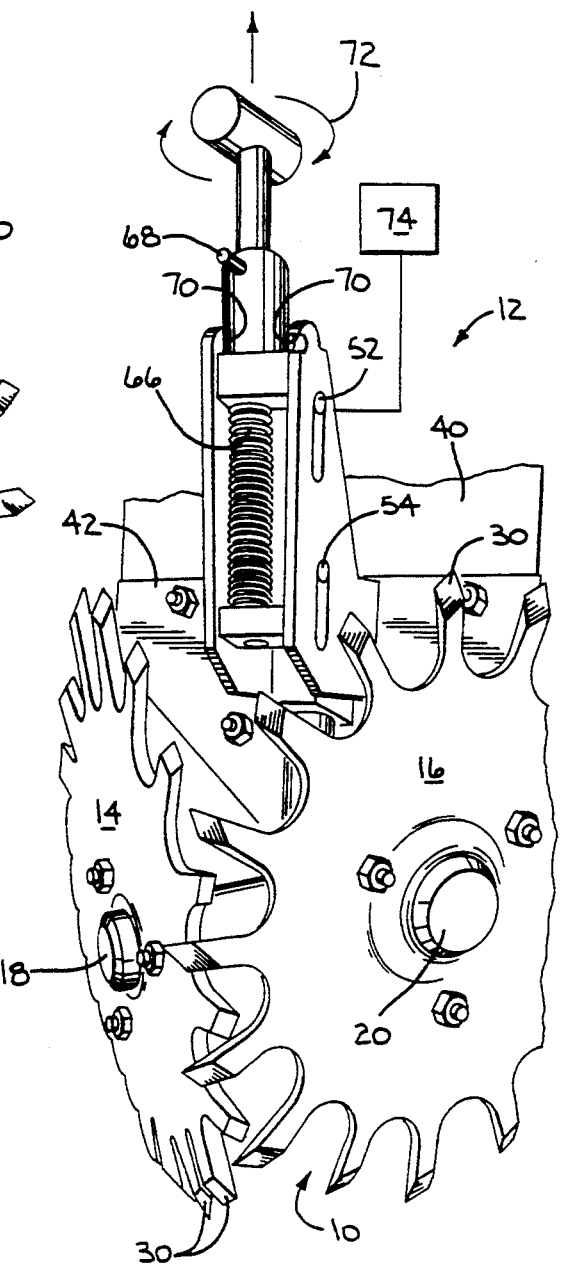
FIG. 2 is a view as in FIG. 1 with the implement in a raised position.
Figure 7:
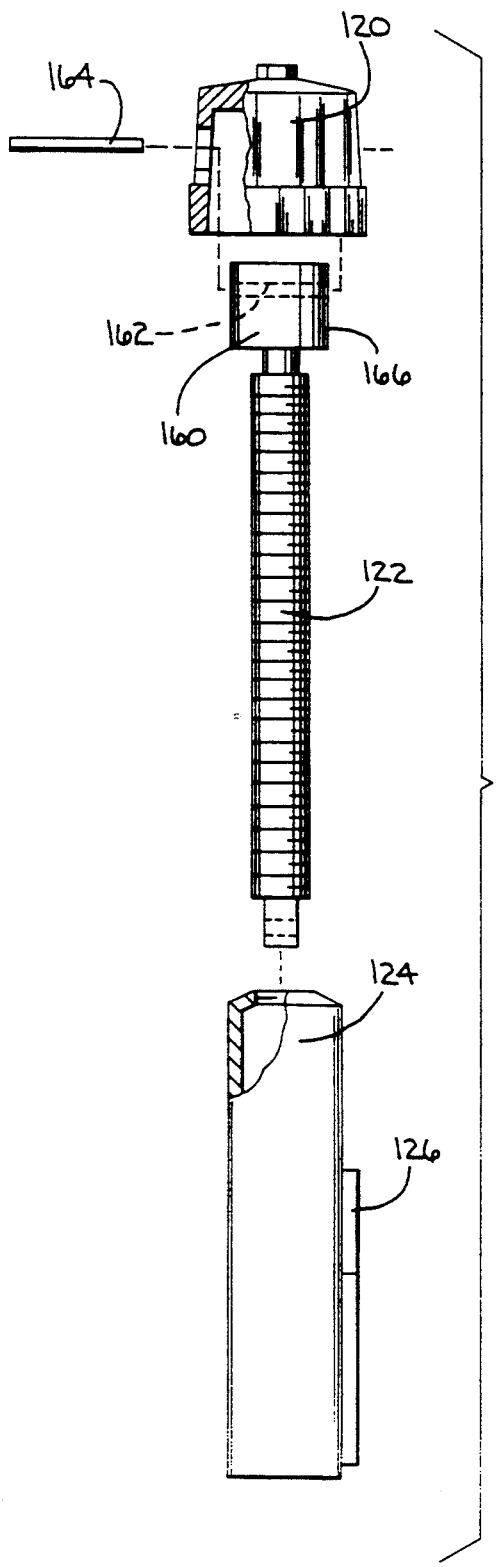
FIG. 7 is an exploded perspective view of the inventive repositioning mechanism.

In FIGS. 1 and 2, a prior art repositioning mechanism for an agricultural implement 10 is shown at 12. The details of the repositioning mechanism are fully described in co-pending U.S. application Ser. No. 735,298, filed in the names of James H. Bassett and Robert E. Boyle, Jr., and entitled "Mechanism for Selectively Repositioning a Farm Implement" in that application. The contents of that application are incorporated herein by reference. The details of operation of the mechanism 12 need not be fully explained to understand the present invention and only that structure which sets out the environment for the present invention will be described below.

The implement 10 depicted is but exemplary of the many types of implements that can be utilized with the present invention. The implement 10 is a residue resituating apparatus which is designed to break up agricultural residue, resituate certain of the residue to the sides of a seed planting row, and break up and aerate the soil in a 4–6 inch wide path for reception of seed. To accomplish this, two cooperating wheels 14, 16 are mounted on bearings 18, 20, respectively, for rotation about transverse axes 22, 24. The wheels 16, 18 have solid hubs 26, 28 from which equidistantly spaced teeth 30 radially project. The wheels 14, 16 are toed in at their bottom portions 32, 34 and diverge from front to rear i.e. left to right in FIGS. 1 and 2. With this arrangement, as the wheels 14, 16 are forced through subjacent soil, the soil produces rotative forces on the wheels 14, 16. As the wheels 14, 16 rotate, the teeth 30 mesh to produce a scissors action. This effectively mulches any picked up residue as well as the underlying soil.

The wheels 14, 16 are mounted to a frame 40 by a bracket 42. A connecting/height adjusting mechanism acts between the bracket 42 and the wheels 14, 16. The mechanism 44 has spaced plates 46, 48 between which a bar 50 is guided in vertical movement. The bar 50 has oppositely projecting pin pairs 52, 54 (one pin in each pair shown), which are guided in vertically elongated slots 56, 58 on the plates 46, 48.

An elongate adjusting rod 60 projects through a slidable block 62 and a fixed block 64 between the plates 46, 48. A spring 66 acts between the blocks 62, 64 to thereby normally bias the block 62 upwardly to thereby elevate the bar 50 and the associated wheels 14, 16. This elevated position is shown in FIG. 2. By depressing the adjusting rod 60 against the force of the spring 66, a pin 68 thereon can be directed into a holding slot 70, defined cooperatively by the plates 46, 48, by rotation of the adjusting rod about its length in the direction of the arrows 72.

Fine vertical adjustment of the wheels 14, 16 is accomplished by an operating handle 74, which operates a secondary adjusting rod 76 that is threaded within the bar 50. Rotation of the operating handle 74 in one direction extends the rod 76 downwardly within the bar 50 to lower the wheels 14, 16, whereas opposite rotation of the operating handle 74 elevates the wheels 14, 16.

Figure 8:
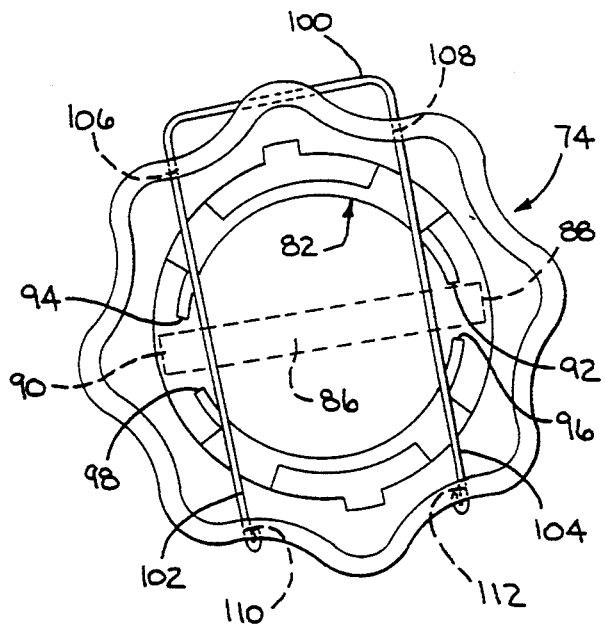
FIG. 8 is a bottom view of a conventional operating handle for a repositioning mechanism.
Figure 9:
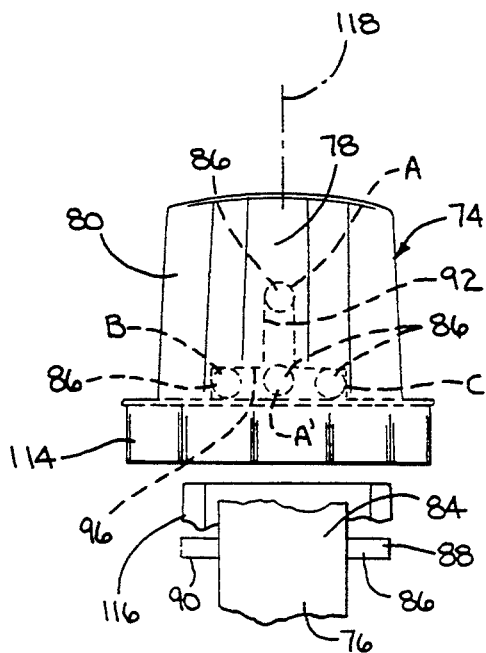
FIG. 9 is a side elevation view of the operating handle in FIG. 8.

One known prior art construction for the operating handle 74 is shown in FIGS. 8 and 9. More particularly, the operating handle 74 has an inverted cup-shaped configuration with a peripheral wall 78 having a knurled outer surface 80 to be grasped and turned by the hand of a user. The operating handle 74 has a blind bore 82 to receive the upper end 84 of the adjusting rod 76. The adjusting rod 76 has a pin 86 which projects from diametrically opposite locations on the rod 76. To effect assembly, the free ends 88, 90 of the pin 86 are guided into vertical legs 92, 94 on two inverted, T-shaped slots 96, 98 defined internally of the operating handle 74. Once the pin ends 88, 90 are seated in the slot legs 92, 94, a U-shaped locking clip 100 is assembled. The locking clip 100 has spaced legs 102, 104 which are directed initially through openings 106, 108 in the peripheral wall 78 of the handle and then through aligned openings 110, 112 located diametrically opposite to the openings 106, 108. As seen in FIG. 8, the length of the legs 102, 104 extends transversely to the length of the pin 86 so that the clip legs 102, 104 block withdrawal of the pin free ends 88, 90 from the slots 96, 98.

The pin 86 is movable in the slots 96, 98 between positions A, B and C, shown in FIG. 9. With the pin in position A, the lower rim 114 of the operating handle 74 surrounds a sleeve 116, within which the adjusting rod 76 is received, and makes keyed connection therewith to prevent rotation of the operating handle 74 about its central axis 118. By drawing upwardly on the handle 74, the pin 86 moves to a transition position shown at A' in FIG. 9, in which in abuts the locking clip 100 and aligns with the cross slot 96. Rotation of the operating handle 74 in one direction situates the pin in position C relative to the handle 74, whereas opposite rotation of the handle situates the handle relative to the pin as shown in position B in FIG. 9. With the pin 86 in the C position, rotation of the handle 74 in a clockwise direction, when viewed from overhead, causes the rod 76 to follow that rotation. Similarly, with the pin 86 in the B position of FIG. 9, counterclockwise rotation of the handle 74, when viewed from overhead, effects a corresponding rotation of the rod 76.

Several of the drawbacks with the handle 74 have been described above in the Background Art section. As can be seen, the clip 100 is relatively thin and thus flexible. It may be difficult for the clip 100 to be directed through both sets of openings 106, 108, 110, 112. If the clip 100 becomes bent, this alignment may be very difficult to achieve. At the same time, the clip 100 is made from metal that is prone to rust and corrosion, particularly in the damp agricultural environment in which it will also be exposed to chemicals.

The operating handle 120, shown in FIGS. 3-7, overcomes the problems associated with the handle 74 of the prior art. The operating handle 120 is designed to rotate an adjusting rod 122 which extends through a sleeve 124 that is welded to a bracket 126 that is used to mount the inventive repositioning mechanism 128 to a support 130, shown schematically in FIG. 3. Rotation of the adjusting rod 122 through the operating handle 120 effects vertical movement of an implement 132 through an appropriate mechanism 134 which has a receptacle for the adjusting rod, which may be a bar that is the same as the bar 50, previously described. In one form, the receptacle is threadably connected to the lower end 136 of the adjusting rod 122. The implement 132 is connected to the receptacle on the mechanism 134 through an appropriate means 135.

The operating handle 120 has an inverted, cup-shaped configuration with a cylindrical, peripheral wall 138, a top wall 140, and an enlarged, annular rim 142 at the bottom of the peripheral wall 138. The peripheral wall 138 has an outer surface 144 that is knurled, as is the outer surface 146 of the rim 142, to facilitate turning of the operating handle 120 by a user. The handle 120 has a bottom wall 148 which is recessed slightly upwardly from the bottom edge 150 of the handle 120 to thereby allow limited penetration of the upper portion 152 of the sleeve 124 into the handle 120.

The inside surface 154 of the rim 142 has a star-shaped configuration which makes keyed connection with the outer surface 156 of the square sleeve 124 in a plurality of different rotational positions for the handle 120 and sleeve 124. With the handle 120 and sleeve 124 making keyed connection, rotation of the handle 120 about its central axis 158 is prohibited.

The adjusting rod 122 has an enlarged head 160 with a through bore 162 to frictionally accept a pin 164 which, in its operative position, projects radially from the outer surface 166 of the head 160 at diametrically opposite locations. The projecting pin 164 cooperates with inverted, T-shaped slots 168 (one shown) defined fully through the peripheral wall 138 of the operating handle 120 at diametrically opposite locations thereon. Each slot 168 has a vertically extending stem 170 and a cross bar 172. Bottom entry to the slot 168 is prohibited by the bottom wall 148 on the handle 120. Consequently, to effect assembly of the operating handle 120, the user must place the operating handle 120 over the head 160 on the adjusting rod 122, align the bore 162 with the slots 168 and then direct the pin 164 through the bores 162 in which bore it is frictionally held.

Once the operating handle 120 is operatively connected to the adjusting rod 122, the pin 164 is movable freely within the T-shaped slots 168. By aligning the pin 164 with the vertical stem 170, the operating handle 120 can be directed downwardly so that the rim surface 154 keys to the upper portion 152 of the sleeve 124. This represents the locked position of FIG. 3 wherein the operating handle 120 is fixed relative to the sleeve 124 which in turn results in the adjusting rod's 122 being prevented from rotating about its length by the edges 174, 176 bounding the stem 170.

By drawing up on the operating handle in the direction of arrow 178 in FIG. 5, the pin 164 is moved to the level of the cross bar 172. The operating handle 120 is then in the release position shown in FIG. 5. In the release position for the handle 120, the operating handle 120 can be rotated in either direction about its axis 158. Rotation of the operating handle 120 in a clockwise direction, when viewed from overhead, bears the slot edge 180 against the pin 164 to thereby effect clockwise rotation of the adjusting bar 122. Counterclockwise rotation of the operating handle 120 bears the slot edge 182 against the pin 164 to effect a counterclockwise rotation of the adjusting rod 122 about its length. A straight or L-shaped slot could also be used in place of the T-shaped slot. An L-shaped slot can be defined by extending one of the edges 174, 176 to the rim 142 as shown by the dotted lines L, L' in FIG. 5. A straight slot aligned with the length of the adjusting rod 122 would suffice. However, the T-shaped slot 168 is preferred.

Preferably, the operating handle 120 is made from metal. It can be cast in one piece. The slots 168 are completely bounded by the rim 142, bottom wall 148 and peripheral wall 138 so that disassembly of the operating handle 120 can be effected only by removing the pin 164. Because the operating handle 120 is made from metal, it is highly durable and is not prone to being stripped by the pin 164 during operation.

Another aspect of the present invention is the provision of a fitting 184 on the top wall 140 of the operating handle 120. The fitting 184 has a hexagonal, or other suitable cross-sectional shape, that allows it to be engaged by a wrench, or other tool, to facilitate either manual or automated rotation of the operating handle 120 through the fitting 184. Preferably, the fitting 184 is integrally formed as one piece with the remainder of the handle 120.

The foregoing disclosure of specific embodiments is intended to be illustrative of the broad concepts comprehended by the invention.

I claim:

1. A repositioning mechanism for an agricultural implement, said repositioning mechanism comprising:
    an adjusting rod having a length;
    a receptacle for the adjusting rod;
    cooperating means on the adjusting rod and receptacle for relatively moving the adjusting rod and receptacle lengthwise of the adjusting rod as an incident of the adjusting rod being rotated about its length;
    means on the receptacle for mounting an agricultural implement so that the agricultural implement moves with the receptacle;
    an operating handle; and
    means for attaching the operating handle to the adjusting rod to facilitate rotation of the adjusting rod about its length by manipulation of the operating handle,
    said attaching means comprising a pin on one of the operating handle and adjusting rod and a slot on the other of the operating handle and adjusting rod for receiving the pin with the operating handle and adjusting rod in an operative position,
    said pin being movable within the slot to allow the operating handle to be rotated relative to the adjusting rod within a limited range,
    said attaching means including cooperating means on the pin, operating handle and adjusting rod for preventing separation of the operating handle and adjusting rod one from the other other than by repositioning the pin relative to the one of the operating handle and adjusting rod to which it attaches and removing the pin from the slot.

2. The agricultural implement repositioning mechanism according to claim 1 in combination with a sleeve through which the adjusting rod extends, there being cooperating keying means on the sleeve and operating handle to selectively prevent relative rotation between the adjusting rod and operating handle about the length of the adjusting rod.

3. The agricultural implement repositioning mechanism according to claim 2 including a bracket for mounting the repositioning mechanism to a support and means are provided for attaching the sleeve to the mounting bracket.

4. The agricultural implement repositioning mechanism according to claim 1 wherein the slot has an L-shaped configuration with first and second transverse legs, one of the first and second legs extending substantially parallel to the length of the adjusting rod.

5. The agricultural implement repositioning mechanism according to claim 1 wherein the slot has a T-shaped configuration with a stem and a crossbar and the stem extends substantially parallel to the length of the adjusting rod.

6. The agricultural implement repositioning mechanism according to claim 1 wherein the operating handle has a single piece that defines and completely bounds said slot.

7. The agricultural implement repositioning mechanism according to claim 1 wherein cooperating means includes means on the pin and the one of the operating handle and adjusting rod for frictionally retaining the pin on the one of the operating handle and adjusting rod.

8. The agricultural implement repositioning mechanism according to claim 1 wherein the cooperating means comprises a bore in the one of the operating handle and adjusting rod to frictionally receive the pin.

9. The agricultural implement repositioning mechanism according to claim 1 wherein the operating handle is made from metal.

10. The agricultural implement repositioning mechanism according to claim 1 wherein the cooperating means on the adjusting rod and receptacle comprises cooperating threads which cause the adjusting rod and receptacle to a) move relatively in one direction as the adjusting rod is rotated in a first direction relative to the receptacle and b) move relatively oppositely to the one direction as the adjusting rod is rotated oppositely to the first direction.

11. A repositioning mechanism for an agricultural implement, said repositioning mechanism comprising:
    an adjusting rod having a length;
    means cooperating between the adjusting rod and an agricultural implement for repositioning an agricultural implement as an incident of the adjusting rod being rotated about its length;
    an operating handle having a peripheral wall with an outside surface that can be grasped by the hand of a user to manipulate the operating handle; and
    means for attaching the operating handle tot he adjusting rod to facilitate rotation of the adjusting rod about its length by manipulation of the operating handle,
    said attaching means comprising a pin on the adjusting rod and a slot on the operating handle extending fully through the peripheral wall of the operating handle to be exposed at the outside surface of the operating handle for receiving the pin with the operating handle and adjusting rod in an operative position, said pin being movable within the slot to allow the operating handle and adjusting rod to be moved relative to each other within a limited range.

12. The repositioning mechanism according to claim 13 in combination with a sleeve through which the adjusting rod extends, said pin being movable within said slot to allow movement of the operating handle lengthwise of the adjusting rod between locked and unlocked positions, there being cooperating keying means on the sleeve and operating handle to prevent rotation of the operating rod and adjusting handle about the length of the adjusting rod with the operating handle in its locked position.

13. The repositioning mechanism according to claim 12 including a bracket for mounting the repositioning mechanism to a support and means are provided for attaching the sleeve to the mounting bracket.

14. The repositioning mechanism according to claim 13 wherein the slot has an L-shaped configuration with first and second transverse legs, one of the first and second legs extending substantially parallel to the length of the adjusting rod.

15. The repositioning mechanism according to claim 13 wherein the slot has a T-shaped configuration with a stem and a crossbar and the stem extends substantially parallel to the length of the adjusting rod.

16. The repositioning mechanism according to claim 11 wherein the operating handle has a single piece that defines and completely bounds said slot.

17. In combination:
a) an adjusting rod to be rotated about an axis and having a pin projecting therefrom and means cooperating between the adjusting rod and an agricultural implement for repositioning an agricultural implement as an incident of the adjusting rod being rotated about its axis; and
b) an operating handle having a peripheral wall with an outside surface to be grasped by the hand of a user and means for attaching the operating handle to the adjusting rod to allow the adjusting rod to be rotated about its axis through the operating handle, said attaching means including a slot in the peripheral wall of the operating handle to accept the pin on the adjusting rod and thereby guide relative movement of the adjusting rod and operating handle within a limited range in at least one of a) a direction substantially parallel to the adjusting rod axis, b) rotation about the axis of the adjusting rod, said operating handle having a single piece that completely bounds the slot to prevent release of the pin from the slot by relatively moving the adjusting rod and operating handle.

18. A repositioning mechanism for an agricultural implement, said repositioning mechanism comprising:
an adjusting rod to be rotated about an axis;
means cooperating between the adjusting rod and an agricultural implement for repositioning an agricultural implement as an incident of the adjusting rod being rotated about its axis;
an operating handle; and
means for attaching the operating handle to the adjusting rod to facilitate rotation of the adjusting rod about its length by manipulation of the operating handle, said attaching means comprising a pin on one of the operating handle and adjusting rod and a slot on the other of the operating handle and adjusting rod for receiving the pin with the operating handle and adjusting rod in an operative position, said pin being movable within the slot to allow the operating handle to be moved with a limited range relative to the adjusting rod in at least one of a) a direction substantially parallel to the axis of the adjusting rod and b) rotation about the axis of the adjusting rod, said attaching means including means cooperating between the pin, operating handle and adjusting rod for preventing separation of the operating handle and adjusting rod, one from the other, other than by repositioning the pin relative to the one of the operating handle and adjusting rod to which it attaches and removing the pin from the slot.

* * * * *